US011704006B1

(12) United States Patent
Neervannan et al.

(10) Patent No.: US 11,704,006 B1
(45) Date of Patent: *Jul. 18, 2023

(54) USER INTERFACE FOR USE WITH A SEARCH ENGINE FOR SEARCHING FINANCIAL RELATED DOCUMENTS

(71) Applicant: AlphaSense Oy, New York, NY (US)

(72) Inventors: Rajmohan Neervannan, Irvine, CA (US); Jaakko Kokko, Espoo (FI); Mathias Creutz, Helsinki (FI)

(73) Assignee: AlphaSense Oy, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/082,765

(22) Filed: Dec. 16, 2022

Related U.S. Application Data

(63) Continuation of application No. 17/945,436, filed on Sep. 15, 2022, now Pat. No. 11,561,682, which is a continuation of application No. 17/532,120, filed on Nov. 22, 2021, which is a continuation of application No. 17/384,075, filed on Jul. 23, 2021, now Pat. No. 11,216,164, which is a continuation of application No. 17/244,994, filed on Apr. 30, 2021, now Pat. No. 11,227,109, which is a continuation of application No. 17/107,148, filed on Nov. 30, 2020, now Pat. No. 11,205,043, which is a continuation of application
(Continued)

(51) Int. Cl.
| | |
|---|---|
| *G06F 3/0484* | (2022.01) |
| *G06F 3/0482* | (2013.01) |
| *G06F 40/30* | (2020.01) |
| *G06N 20/00* | (2019.01) |
| *G06F 40/253* | (2020.01) |
| *G06F 40/211* | (2020.01) |
| *G06F 40/117* | (2020.01) |

(52) U.S. Cl.
CPC .......... *G06F 3/0484* (2013.01); *G06F 3/0482* (2013.01); *G06F 40/30* (2020.01); *G06N 20/00* (2019.01); *G06F 40/117* (2020.01); *G06F 40/211* (2020.01); *G06F 40/253* (2020.01)

(58) Field of Classification Search
CPC ...... G06F 3/0484; G06F 40/30; G06F 3/0482; G06N 20/00
USPC ........................................................ 715/738
See application file for complete search history.

(56) References Cited

U.S. PATENT DOCUMENTS

| | | |
|---|---|---|
| 5,555,426 A | 9/1996 | Johnson |
| 5,704,060 A | 12/1997 | Del Monte |
| (Continued) | | |

OTHER PUBLICATIONS

USPTO, Non-Final Office Action for corresponding U.S. Appl. No. 17/404,350, dated Dec. 23, 2021, 11 pages.
(Continued)

*Primary Examiner* — William D Titcomb
(74) *Attorney, Agent, or Firm* — NK Patent Law

(57) ABSTRACT

A method for rendering context based information on a user interface includes receiving a user request to extract the context based information from a database. The database includes a plurality of documents and the request includes at least one search criteria required to determine a context of the user request. The method includes generating a list of documents corresponding to the context of the user request and rendering on a viewing portion of the user interface the list of documents corresponding to the context of the user request.

38 Claims, 13 Drawing Sheets

Related U.S. Application Data

No. 15/891,254, filed on Feb. 7, 2018, now Pat. No. 11,023,675, which is a continuation of application No. 15/820,507, filed on Nov. 22, 2017, now abandoned, which is a continuation of application No. 12/939,165, filed on Nov. 3, 2010, now abandoned.

(60) Provisional application No. 61/257,466, filed on Nov. 3, 2009.

(56) References Cited

U.S. PATENT DOCUMENTS

| | | | |
|---|---|---|---|
| 5,754,938 | A | 5/1998 | Herz |
| 6,460,034 | B1 | 10/2002 | Wical |
| 7,360,163 | B2 | 4/2008 | Masuda |
| 7,454,393 | B2 * | 11/2008 | Horvitz ............... G06F 16/3344 706/50 |
| 7,606,798 | B2 | 10/2009 | Ge |
| 7,739,221 | B2 | 6/2010 | Lawler et al. |
| 8,131,779 | B2 | 3/2012 | Jonker et al. |
| 8,180,713 | B1 | 5/2012 | Rigby et al. |
| 8,265,925 | B2 | 9/2012 | Aarskog |
| 8,589,373 | B2 | 11/2013 | Mayer |
| 8,606,815 | B2 | 12/2013 | Chen et al. |
| 8,862,573 | B2 * | 10/2014 | Musgrove ............. G06F 16/951 707/722 |
| 8,949,233 | B2 | 2/2015 | Hsiao et al. |
| 9,129,008 | B1 | 9/2015 | Kuznetsov |
| 9,183,286 | B2 | 11/2015 | Chen |
| 9,405,751 | B2 | 8/2016 | Hull |
| 10,198,506 | B2 | 2/2019 | Qiao |
| 11,023,675 | B1 * | 6/2021 | Neervannan .......... G06F 40/211 |
| 11,205,043 | B1 * | 12/2021 | Neervannan ........ G06F 16/9535 |
| 11,205,044 | B1 * | 12/2021 | Neervannan ......... G06Q 10/067 |
| 11,216,164 | B1 * | 1/2022 | Neervannan .......... G06F 16/338 |
| 11,227,109 | B1 * | 1/2022 | Neervannan ......... G06Q 10/067 |
| 11,244,273 | B1 * | 2/2022 | Neervannan ............ G06F 16/23 |
| 11,281,739 | B1 * | 3/2022 | Neervannan .......... G06F 16/954 |
| 11,347,383 | B1 * | 5/2022 | Neervannan ............ G06N 20/00 |
| 11,474,676 | B1 * | 10/2022 | Neervannan ........ G06F 16/9532 |
| 11,561,682 | B1 * | 1/2023 | Neervannan .......... G06F 16/215 |
| 2002/0156760 | A1 | 10/2002 | Lawrence |
| 2004/0230898 | A1 | 11/2004 | Blakely et al. |
| 2005/0033711 | A1 | 2/2005 | Horvitz et al. |
| 2005/0055628 | A1 | 3/2005 | Chen et al. |
| 2005/0086224 | A1 | 4/2005 | Franciosa |
| 2005/0235034 | A1 | 10/2005 | Chen et al. |
| 2005/0267871 | A1 | 12/2005 | Marchisio et al. |
| 2006/0041605 | A1 | 2/2006 | King et al. |
| 2006/0041828 | A1 | 2/2006 | King et al. |
| 2006/0050996 | A1 | 3/2006 | King et al. |
| 2006/0069589 | A1 | 3/2006 | Nigam et al. |
| 2006/0104515 | A1 | 5/2006 | King et al. |
| 2006/0116994 | A1 | 6/2006 | Jonker et al. |
| 2006/0200341 | A1 | 9/2006 | Corston-Oliver et al. |
| 2006/0200342 | A1 | 9/2006 | Corston-Oliver et al. |
| 2006/0242040 | A1 | 10/2006 | Rader |
| 2006/0253418 | A1 | 11/2006 | Charnock et al. |
| 2006/0277465 | A1 | 12/2006 | Pandit et al. |
| 2007/0005646 | A1 | 1/2007 | Dumais et al. |
| 2007/0033221 | A1 | 2/2007 | Copperman |
| 2007/0047819 | A1 | 3/2007 | Hull |
| 2007/0185859 | A1 | 8/2007 | Flowers et al. |
| 2007/0192265 | A1 | 8/2007 | Chopin et al. |
| 2007/0219986 | A1 | 9/2007 | Egozi |
| 2007/0260598 | A1 | 11/2007 | Odom |
| 2007/0300142 | A1 | 12/2007 | King et al. |
| 2008/0033587 | A1 | 2/2008 | Kurita et al. |
| 2008/0059451 | A1 | 3/2008 | Musgrove |
| 2008/0097985 | A1 | 4/2008 | Olstad et al. |
| 2008/0109406 | A1 | 5/2008 | Krishnasamy et al. |
| 2008/0120129 | A1 | 5/2008 | Seubert |
| 2008/0133488 | A1 | 6/2008 | Bandaru et al. |
| 2008/0148147 | A1 | 6/2008 | Poston |
| 2008/0154883 | A1 | 6/2008 | Chowdhury et al. |
| 2008/0177994 | A1 | 7/2008 | Mayer |
| 2008/0214152 | A1 | 9/2008 | Ramer et al. |
| 2008/0243842 | A1 | 10/2008 | Liang |
| 2008/0249764 | A1 | 10/2008 | Huang et al. |
| 2008/0256040 | A1 | 10/2008 | Sundaresan et al. |
| 2008/0270387 | A1 | 10/2008 | Weitenberner |
| 2008/0313172 | A1 | 12/2008 | King et al. |
| 2009/0048823 | A1 | 2/2009 | Liu et al. |
| 2009/0077658 | A1 | 3/2009 | King et al. |
| 2009/0112892 | A1 | 4/2009 | Cardie et al. |
| 2009/0119156 | A1 | 5/2009 | Dulepet |
| 2009/0119157 | A1 | 5/2009 | Dulepet |
| 2009/0164387 | A1 | 6/2009 | Armstrong et al. |
| 2009/0164417 | A1 | 6/2009 | Nigam et al. |
| 2009/0171951 | A1 | 7/2009 | Lucas et al. |
| 2009/0204610 | A1 | 8/2009 | Hellstrom et al. |
| 2009/0254540 | A1 | 10/2009 | Musgrove et al. |
| 2009/0254572 | A1 | 10/2009 | Redlich et al. |
| 2009/0265307 | A1 | 10/2009 | Reisman et al. |
| 2009/0319342 | A1 | 12/2009 | Shilman et al. |
| 2010/0030799 | A1 | 2/2010 | Parker et al. |
| 2010/0114899 | A1 | 5/2010 | Guha et al. |
| 2010/0169317 | A1 | 7/2010 | Wang et al. |
| 2010/0177964 | A1 | 7/2010 | King et al. |
| 2010/0191758 | A1 | 7/2010 | Peng et al. |
| 2010/0222032 | A1 | 9/2010 | Griffin |
| 2010/0257117 | A1 | 10/2010 | Shvadron et al. |
| 2010/0262454 | A1 | 10/2010 | Sommer |
| 2010/0278453 | A1 | 11/2010 | King |
| 2011/0078167 | A1 | 3/2011 | Sundaresan et al. |
| 2011/0099184 | A1 | 4/2011 | Symington |
| 2011/0179009 | A1 | 7/2011 | Nam |
| 2011/0231395 | A1 | 9/2011 | Vadlamani et al. |
| 2011/0261049 | A1 | 10/2011 | Cardno et al. |
| 2016/0140237 | A1 | 5/2016 | Musgrove |
| 2020/0143384 | A1 | 5/2020 | Koontz et al. |
| 2020/0184151 | A1 | 6/2020 | Ekmekci et al. |

OTHER PUBLICATIONS

USPTO, Non-Final Office Action for corresponding U.S. Appl. No. 17/538,959, dated Feb. 3, 2022, 9 pages.

USPTO, Non-Final Office Action for corresponding U.S. Appl. No. 17/384,138, dated Mar. 8, 2022, 11 pages.

USPTO, Final Office Action for corresponding U.S. Appl. No. 17/384,138, dated Aug. 10, 2022, 14 pages.

*Alphasense, Oy and Alphasense, Inc. v. Sentio, Inc.*, C.A. No. 21-1011 (CFC), Defendant Sentio, Inc.'s Opening Brief in Support of its Motion to Dismiss the Complaint Pursuant to Fed. R. Civ. p. 12(B)(6) for Failure to State a Claim Under 35 U.S.C. § 101, dated Sep. 1, 2021, 29 pages.

*Alphasense, Oy and Alphasense, Inc. v. Sentio, Inc.*, C.A. No. 21-1011-CFC, Plaintiff Alphasense Oy's and Alphasense, Inc.'s Opposition to Defendant Sentio, Inc.'s Motion to Dismiss the Complaint Pursuant to Fed. R. Civ. p. 12(B)(6) for Failure to State a Claim Under 35 U.S.C. § 101, dated Oct. 14, 2021, 34 pages.

USPTO, Non-Final Office Action for corresponding U.S. Appl. No. 17/532,120, dated Oct. 12, 2022, 13 pages.

USPTO, Non-Final Rejection for U.S. Appl. No. 12/939,165, dated Aug. 28, 2017.

USPTO, Final Rejection for U.S. Appl. No. 12/939,165, dated Jun. 13, 2016.

USPTO, Non-Final Rejection for U.S. Appl. No. 12/939,165, dated Aug. 13, 2015.

USPTO, Final Rejection for U.S. Appl. No. 12/939,165, dated May 7, 2015.

USPTO, Non-Final Rejection for U.S. Appl. No. 12/939,165, dated Jun. 24, 2014.

Mir S. Siadaty, et al., "Relemed: sentence-level search engine with relevance score for the MEDLINE database of biomedical articles", BMC Medical Informatics and Decision Making, Jul. 2007:1, pp. 1-11 (Jan. 10, 2007).

Osamu Furuse et al., "Opinion Sentence Search Engine on Open-domain Blog", Proceedings of International Conference on Artificial Intelligence, 2007, pp. 1-6.

(56) References Cited

OTHER PUBLICATIONS

Jahna Otterbacher et al., "Using Random Walks for Question-focused Sentence Retrieval", Proceedings of Human Language Technology Conference—Conference on Empirical Methods in Natural Language Processing 2005, pp. 915-922 (Oct. 6, 2005).
Vanessa Graham Murdock, Aspects of sentence retrieval:, U Mass Amherst Dissertation for Ph.D., pp. 1-171, Sep. 2006.
USPTO, Non-Final Rejection in U.S. Appl. No. 15/820,507 dated Feb. 27, 2018.
USPTO, Final Rejection in U.S. Appl. No. 12/939,165 dated Mar. 28, 2018.
USPTO, Non-Final Rejection in U.S. Appl. No. 15/697,418 dated Dec. 19, 2018.
USPTO, Non-Final Rejection in U.S. Appl. No. 12/939,165 dated Jun. 24, 2014.
USPTO, Non-Final Office Action for corresponding U.S. Appl. No. 17/244,994, dated Aug. 27, 2021.
*Alphasense, Oy and Alphasense, Inc.*, Plaintiffs, v. *Sentieo, Inc.*, Defendant, Defendant Sentieo, Inc.'s Opening Brief in Support of Its Motion To Dismiss the Complaint Pursuant To Fed. R. Div. p. 12(B)(6) for Failure To State a Claim Under 35 U.S.C. § 101, Case 1:21-cv-01011-CFC, Document 30, Filed Sep. 1, 2021, 29 pages.
USPTO, Non-Final Rejection in U.S. Appl. No. 17/107,148 dated Feb. 9, 2021.
USPTO, Non-Final Rejection in U.S. Appl. No. 17/384,138 dated Nov. 12, 2021.
USPTO, Non-Final Office Action for corresponding U.S. Appl. No. 17/694,792 dated Feb. 3, 2023, 10 pages.

\* cited by examiner

AAPL-APPLE INC FORM 10-K 10-27-2009

TABLE OF CONTENTS

110 — Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.

112 — Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.

PART 1:
ITEM 1. BUSINESS
COMPANY BACKGROUND

Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.

BUSINESS STRATEGY

114 — Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.

116 — Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros

CONSUMER AND SMALL AND MID-SIZED BUSINESS

Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.

FIG. 9A

AAPL-APPLE INC FORM 10-K 10-27-2009

TABLE OF CONTENTS

Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat.

CAPITAL ASSETS

116 — Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. ipsum dolor sit amet, illud maiestatis eu vix. Brute laboramus appellantur te pri, vis eros pericula id. Qui solum delenit adversarium ex, mei deleniti petentium ad. Brute laboramus appellantur te pri, pericula id. Qui solum delenit adversarium ex, mei deleniti petentium ad.

OFF-BALANCE SHEET ARRANGEMENTS AND CONTRATUAL OBLIGATIONS:

112 — Lorem ipsum dolor sit amet, illud maiestatis eu vix, erat prompta nec an, cum an oblique persequeris intellegebat. Brute laboramus appellantur te pri, vis pericula id. Qui solum delenit adversarium ex, mei deleniti petentium ad. Lorem ipsum dolor sit amet, illud maiestatis eu vix, erat prompta nec an, an oblique persequeris intellegebat.

Brute laboramus appellantur te pri, vis eros pericula id. Qui solum delenit adversarium ex, mei deleniti petentium ad. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.

FIG. 9B

NSM 10Q FOR PERIOD ENDING 08-29-2010 FILED 09-28-2010

120 ⟶ Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.
Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.
Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum eros ti sit cum vis eros an oblique persequeris intellegebat. Brute laboramus appellantur te pri, vis eros pericula id. Qui solum delenit adversarium ex, mei deleniti petentium ad. Qui solum delenit adversarium ex, mei deleniti petentium ad.

122 ⟶ Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.

FSC 10Q FOR PERIOD ENDING 06-27-2010 FILED 08-04-2010

Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.
Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.
124 ⟶ Lorem ipsum dolor sit amet, illud maiestatis eu vix, erat prompta nec an, cum an oblique persequeris intellegebat. Brute laboramus appellantur te pri, vis eros

NTC 10Q FOR PERIOD ENDING 06-26-2010 FILED 07-30-2010

Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum eros ti sit cum vis eros an oblique persequeris intellegebat. Brute laboramus appellantur te pri, vis eros

FIG. 10A

Lorem ipsum dolor sit amet, illud maiestatis eu vix, erat prompta nec an, cum
an oblique persequeris intellegebat. Brute laboramus appellantur te pri, vis eros
pericula id. Qui solum delenit adversarium ex, mei deleniti petentium ad. Lorem
ipsum dolor sit amet, illud maiestatis eu vix, erat prompta nec an, cum
an oblique persequeris intellegebat. **Brute laboramus appellantur te pri, vis eros
pericula id. Qui solum delenit adversarium ex, mei deleniti petentium ad.**

| TXN 10Q FOR PERIOD ENDING 06-30-2010 FILED 07-22-2010 |
|---|

Lorem ipsum dolor sit amet, illud maiestatis eu vix, erat prompta nec an, **cum
an oblique persequeris intellegebat. Brute laboramus** appellantur te pri, vis eros
pericula id. Qui solum delenit adversarium ex, mei deleniti petentium ad.
Lorem ipsum dolor sit amet, illud maiestatis eu vix, erat prompta nec an, cum
an oblique persequeris intellegebat. **Brute laboramus appellantur te pri, vis eros
pericula id. Qui solum delenit adversarium ex, mei deleniti petentium ad.**
Lorem ipsum dolor sit amet, illud maiestatis eu vix, erat prompta nec an, cum
an oblique persequeris intellegebat. Brute laboramus appellantur te pri, vis eros
pericula id. Qui solum delenit adversarium ex, mei deleniti petentium ad. Lorem ipsum
dolor sit amet, illud maiestatis eu vix, erat prompta nec an, cum eros ti sit cum vis eros
an oblique persequeris intellegebat. Brute laboramus appellantur te pri, vis eros
pericula id. Qui solum delenit adversarium ex, mei deleniti petentium ad. Qui solum
delenit adversarium ex, mei deleniti petentium ad.
Lorem ipsum dolor sit amet, illud maiestatis eu vix, erat prompta nec an, cum
an oblique persequeris intellegebat. Brute laboramus appellantur te pri, vis eros
pericula id. Qui solum delenit adversarium ex, mei deleniti petentium ad. Lorem
ipsum dolor sit amet, illud maiestatis eu vix, erat prompta nec an, cum
an oblique persequeris intellegebat. Brute laboramus appellantur te pri, vis eros
pericula id. Qui solum delenit adversarium ex, mei deleniti petentium ad.

| MU 10Q FOR PERIOD ENDING 06-03-2010 FILED 07-13-2010 |
|---|

Lorem ipsum dolor sit amet, illud maiestatis eu vix, **erat prompta nec an, cum
an oblique persequeris intellegebat. Brute laboramus** appellantur te pri, vis eros
pericula id. **Qui solum delenit adversarium ex, mei deleniti petentium ad. Lorem
ipsum dolor sit amet, illud maiestatis eu vix, erat prompta nec an, cum
an oblique persequeris intellegebat.** Brute laboramus appellantur te pri, vis eros
pericula id. Qui solum delenit adversarium ex, mei deleniti petentium ad.
Lorem ipsum dolor sit amet, illud maiestatis eu vix, erat prompta nec an, cum
an oblique persequeris intellegebat. **Brute laboramus appellantur te pri, vis eros
pericula id. Qui solum delenit adversarium ex, mei deleniti petentium ad.**
Lorem ipsum dolor sit amet, illud maiestatis eu vix, erat prompta nec an, cum
an oblique persequeris intellegebat. Brute laboramus appellantur te pri, vis eros

FIG. 10B

USER INTERFACE FOR USE WITH A SEARCH ENGINE FOR SEARCHING FINANCIAL RELATED DOCUMENTS

CROSS-REFERENCE TO RELATED APPLICATIONS

This application is a continuation of U.S. patent application Ser. No. 17/945,436 entitled "USER INTERFACE FOR USE WITH A SEARCH ENGINE FOR SEARCHING FINANCIAL RELATED DOCUMENTS", filed on Sep. 15, 2022, which is a continuation of U.S. patent application Ser. No. 17/532,120 entitled "USER INTERFACE FOR USE WITH A SEARCH ENGINE FOR SEARCHING FINANCIAL RELATED DOCUMENTS", filed on Nov. 22, 2021, which is a continuation of U.S. patent application Ser. No. 17/384,075 entitled "SERVER WITH ASSOCIATED REMOTE DISPLAY HAVING IMPROVED ORNAMENTALITY AND USER FRIENDLINESS FOR SEARCHING DOCUMENTS ASSOCIATED WITH PUBLICLY TRADED COMPANIES", filed on Jul. 23, 2021, now U.S. Pat. No. 11,216,164 issued on Jan. 4, 2022, which is a continuation of U.S. patent application Ser. No. 17/244,994 entitled "USER INTERFACE FOR USE WITH A SEARCH ENGINE FOR SEARCHING FINANCIAL RELATED DOCUMENTS", filed on Apr. 30, 2021, now U.S. Pat. No. 11,227,109 issued on Jan. 18, 2022, which is a continuation of U.S. patent application Ser. No. 17/107,148 entitled "USER INTERFACE FOR USE WITH A SEARCH ENGINE FOR SEARCHING FINANCIAL RELATED DOCUMENTS", filed on Nov. 30, 2020, now U.S. Pat. No. 11,205,043 issued on Dec. 21, 2021, which is a continuation of U.S. patent application Ser. No. 15/891,254 entitled "USER INTERFACE FOR USE WITH A SEARCH ENGINE FOR SEARCHING FINANCIAL RELATED DOCUMENTS", filed on Feb. 7, 2018, now U.S. Pat. No. 11,023,675 issued on Jun. 1, 2021, which is a continuation of U.S. patent application Ser. No. 15/820,507 entitled "USER INTERFACE FOR USE WITH SENTENCE LEVEL ANALYSIS AND SEARCHING OF FINANCIAL RELATED DOCUMENTS FOR PUBLICLY TRADED COMPANIES", filed on Nov. 22, 2017, which is a continuation of U.S. patent application Ser. No. 12/939,165 entitled "METHOD AND SYSTEM FOR CONDUCTING CONTEXTUAL SENTENCE LEVEL DEEP SEARCH WITH FORWARD LOOKING, RECURRING, SUBJECTIVITY AND SENTIMENT", filed on Nov. 3, 2010, which claims the benefit under 35 U.S.C. § 119 to U.S. Provisional Patent Application Ser. No. 61/257,466 filed on Nov. 3, 2009. Each of the applications referenced herein are incorporated by reference in their entirety.

FIELD

The disclosure relates generally to a user interface for use with a search engine for searching financial related documents.

BACKGROUND

Conventional web search engines return links to entire documents in response to a search query consisting of keywords or phrases given by the user. In the financial domain, the end user is often a financial analyst who is researching the information source and looking for specific textual information within a specific contextual topic. Text search software is able to find specific keywords, but typically misses the many synonyms and alternative expressions that the user was not able to think about, or does not have time to go through one by one. For example, "sales growth" as a topic could be expressed as "revenue expansion", "increasing customer demand" or any number of tens or even hundreds of combinations of synonyms, with phrases broken up within a sentence or across multiple sentences. Searching for each of those terms or all of those terms at once is not practical, as it would take a lot of time, would require referral to synonyms and may not return some or most of the actual sentences or paragraphs that one seeks. Traditional search engines can therefore either miss the relevant and important items of interest, or bring too many documents that contain the same keywords but in the wrong context, in effect rendering the search useless. Also, financial analysts are often evaluating whether the text expressions are positive or negative for the company's stock price, but traditional search engines do not allow the analyst to search for text that is either positive or negative from the perspective of the price of the company's stock. In addition, the analyst would like to know if the statement was made earlier, is a recurring statement and if it refers to an event in the future.

Thus, it is desirable to provide a method and a system for efficiently conducting contextual, uniqueness or recurring, tense and sentiment-aware deep search within a document, and it is to this end that the disclosure is directed.

BRIEF DESCRIPTION OF THE DRAWINGS

FIGS. 5A and 5B illustrate an example of a user interface for the deep search system for an initial query and a list of results, respectively, in the financial industry;

FIG. 6 illustrates an example of a sentiment heat map user interface of the deep search system;

FIG. 8 illustrates an example of a search results user interface of the deep search system, where the viewing interface allows the user to compare documents side by side;

FIGS. 9A and 9B illustrate portions of a document highlighted that is made possible by the deep search system; and FIGS. 10A and 10B illustrate an example of a multi-document summary that is made possible by the deep search system.

DETAILED DESCRIPTION OF ONE OR MORE EMBODIMENTS

The disclosure is particularly applicable to a web-based client server architecture deep search system and method for the financial industry and it is in this context that the disclosure will be described. It will be appreciated, however, that the system and method in accordance with the invention has much greater utility since it can be used for searching in other industries or with other types of pieces of content (such as the legal industry and legal documents, the medical industry and medical documents, etc.) and the system can be implemented using other computer system architectures and the system is not limited to any particular computer architecture. For illustration purposes, the deep search system and method implemented in the financial industry is now described in more detail.

The system and method may be used to perform a textual search across a collection of documents in one or more electronic data sources, in the financial domain, over time, guided by concepts and scenarios pre-defined by financial experts. The system includes a context extraction engine that will a) recognize semantically defined unique and recurring scenarios within the textual material, consisting of a partial or whole sentence or multiple sentences, b) analyze and classify each scenario based on tense recognizing linguistic rules and natural language processing techniques, c) analyze sentiment and subjectivity to determine if the scenario is objective or subjective and d) determine the polarity and strength of sentiment relative to the company releasing the textual information and the likely impact on its stock price or the price of its other securities. The sentiment, subjectivity, the polarity and strength of the sentiment and the impact of the information may be stored as metadata associated with each piece of content. Based on this metadata, the system enables sophisticated searching within and across pieces of content, such as documents, SEC or other regulatory filings, transcripts of investor calls and presentations, videos, blogs, posts and the like, to find the specific information that the user is looking for. The system also scores companies in real-time on a continuous scale from negative to neutral to positive, and enables a user to rank and screen companies to generate new investment ideas and make better investment decisions. Now, an example of an implementation of the search system is described in more detail.

Figure 1:
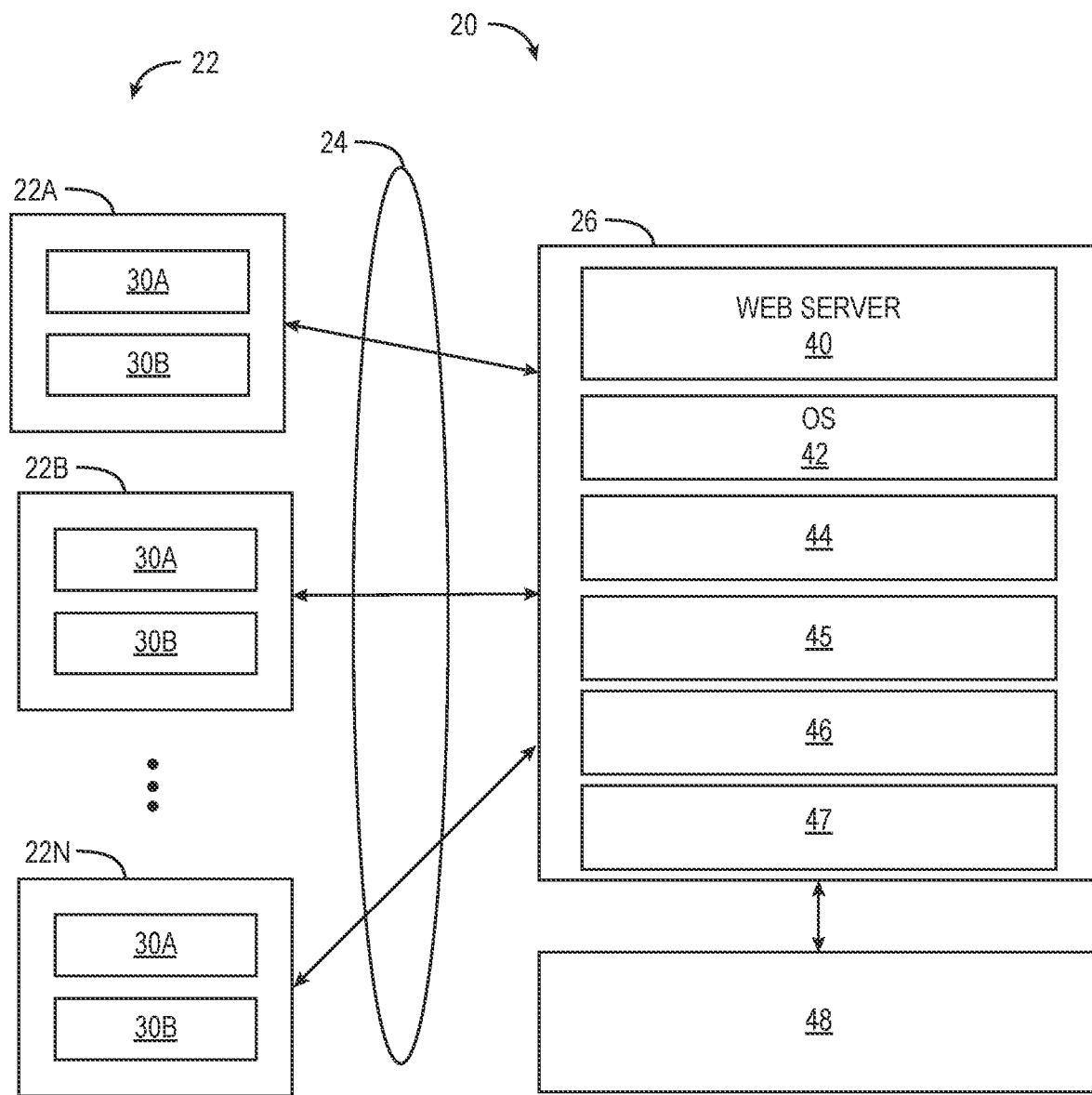
FIG. 1 illustrates an example of an implementation of a search system for efficiently conducting contextual and sentiment-aware deep search within a piece of content.

FIG. 1 illustrates an example of an implementation of a search system 20 for efficiently conducting contextual and sentiment-aware deep search within a piece of content, such as a document, a piece of text, a blog, a posting and the like. The system may be implemented as a client/server type architecture as shown in FIG. 1, but may also be implemented using other architectures, such as cloud computing, software as a service model, a mainframe/terminal model, a stand-alone computer model, a plurality of lines of code on a computer readable medium that can be loaded onto a computer system, a plurality of lines of code downloadable to a computer and the like which are within the scope of the disclosure.

The system 20 may be one or more computing devices 22 (such as computing devices 22a, 22b, . . . , 22n) that connect to, communicate with and/or exchange data over a link 24 to a search system 26 that interact with each other to provide the contextual and sentiment-aware deep search within a piece of content. Each computing device may be a processing unit based device with sufficient processing power, memory/storage and connectivity/communications capabilities to connect to and interact with the system 26. For example, each computing device 22 may be an Apple iPhone or iPad product, a Blackberry or Nokia product, a mobile product that executes the Android operating system, a personal computer, a tablet computer, a laptop computer and the like and the system is not limited to operate with any particular computing device. The link 26 may be any wired or wireless communications link that allows the one or more computing devices and the system 26 to communicate with each other. In one example, the link may be a combination of wireless digital data networks that connect to the computing devices and the Internet. The search system 26 may be implemented as one or more server computers (all located at one geographic location or in disparate locations) that execute a plurality of lines of computer code to implement the functions and operations of the search system as described below in more detail. Alternatively, the search system 26 may be implemented as a hardware unit in which the functions and operations of the back end system are programmed into a hardware system. In one implementation, the one or more server computers may use 4-core Intel® processors, run the Linux operating system, and execute Java, Ruby, Regular Expression, Flex 4.0, SQL etc.

In the implementation shown in FIG. 1, each computing device 22 may further comprise a display 30a and a browser application 30b so that the display 30a can display web pages generated by the search system 26 and the user can fill in forms to provide search queries and the like to the search system 26. The browser application 30b may be a plurality of lines of computer code executed by a processing unit of the computing device. Each computing device 22 may also have the usual components of a computing device such as one or more processing units, memory, permanent storage, wireless/wired communication circuitry, an operating system, etc.

In the implementation shown in FIG. 1, the search system 26 may further comprise a web server 40 (that may be software based or hardware based) that allows each computing device to connect to and interact with the search system 26 such as sending web pages and receiving information from the computing devices and a typical operating system 42 that is executed by one or more processing units that are part of the search system implementation. The search system 26 may further comprise a content extraction unit/engine 44, a linguistic analysis and word/phrase tagging unit 45, a sentiment analyzer 46, a search engine 47 and a store 48, that may be implemented as a software based or hardware based database, that may store the pieces of content associated with the system, the metadata generated by the search system for each piece of content, user preferences and the like. The content extraction engine/unit 44 may a) recognize semantically defined scenarios within the textual material, consisting of a partial or whole sentence or multiple sentences. The linguistic unit 45 analyzes and classifies each scenario based on linguistic rules and natural language processing techniques to determine subjectivity that are described below. The sentiment analyzer 46 analyzes sentiment and subjectivity to determine if the scenario is objective or subjective and determines the polarity and strength of sentiment of the sentence, paragraph or appropriate part of the piece of content relative to the company releasing the textual information and the likely impact on its stock price or the price of its other securities. The search engine 47 can perform searches based on the metadata, generate content to be displayed on the user interface of the system as well as generate reports of the system that are described below in more detail. In one implementation, the search engine may be the SOLR search engine which is open source enterprise search platform from the Apache Lucene project (additional information about SOLR can be found at http://lucene.apache.org/solr/ which is incorporated herein by reference.) The store 48 also contains an archive of "raw" pieces of content (unprocessed or tagged) and tagged piece of content. The user interface of the search system (implemented as a user interface unit/portion) allows a user to conduct topical and sentiment filter based deep searches as described below in more detail.

Figure 2:
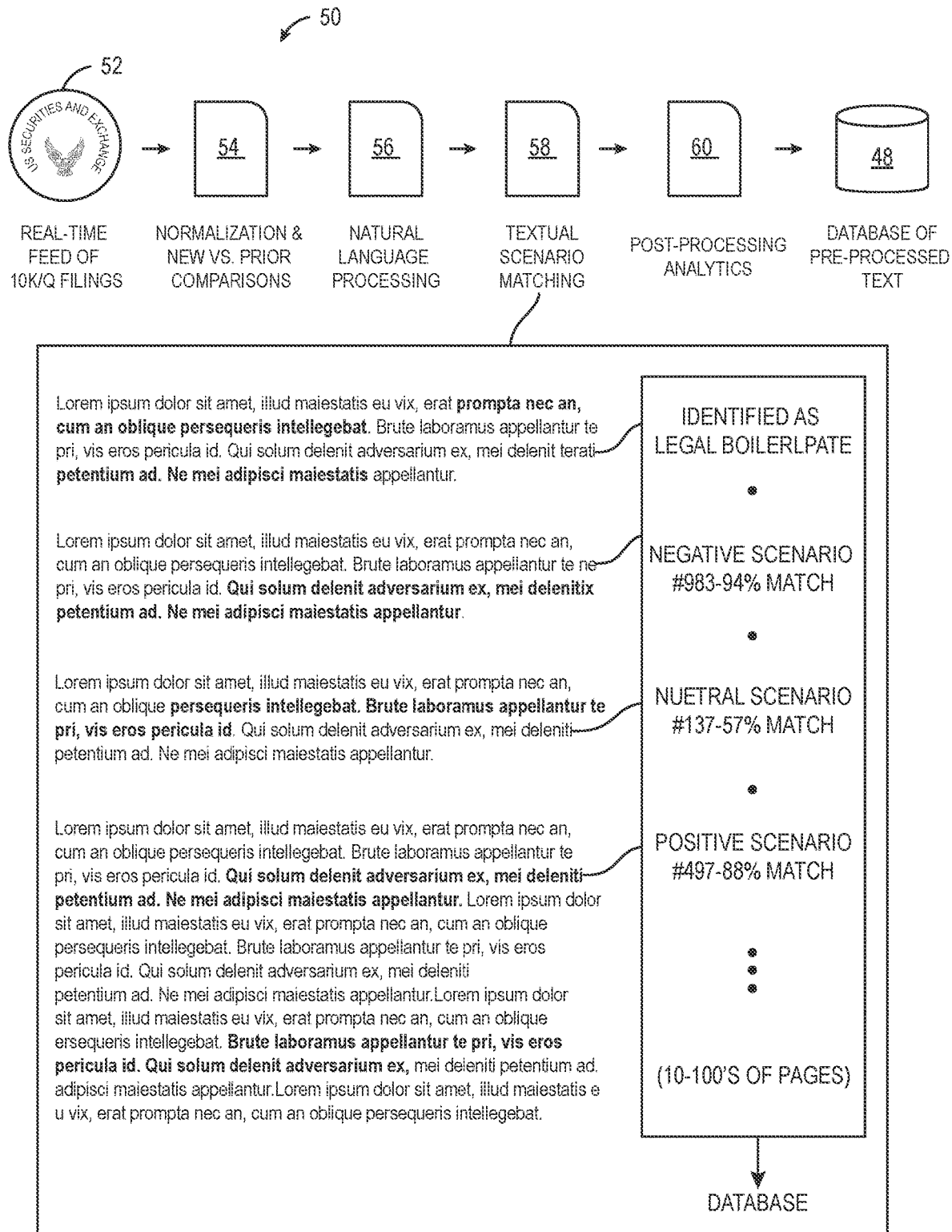
FIG. 2 illustrates an overview of the deep search process.

FIG. 2 illustrates an overview of the deep search process 50. In the process, the search system receives feeds, that may be real-time, of pieces of content (52) such as financial documents including 10K, 10Q or other SEC filings, or investor conference call transcripts, in the financial example. The content extractor unit of the system cleans the incoming pieces of content and normalizes the pieces of content (54). The content extractor unit of the system also extracts zones (particular sections of a document such as header, body, exhibits, MDA, and Footnotes in SEC filing documents) and sentences so that unique, meaningful information is separated from recurring or other boilerplate information during natural language processing. Often financial filings contain a large portion of recurring text that is repeated from the prior quarter, and this is typically less interesting to investors than new statements. In the content extractor unit and linguistic unit of the system, using thousands of structured concepts and scenarios defined through careful expert analysis, semantic tags are assigned by linguistic and machine learning processes trained by domain experts (56). The linguistic unit also discerns the topic of the content using special linguistic rules which is different from traditional search engines where a search is performed using word and phrases without contextual understanding of the text. For example, the linguistic analysis unit tags sentences based on their tense, to determine whether they talk about something that happened in the past, is continuing, or is expected to happen in the future. This is accomplished through a combination of linguistic analysis and domain-based language models that understand, for example, that a noun phrase like "deferred expenses" implies something about the future. In the system described here, the custom linguistic rules specifically designed for the financial domain, provide highly specialized and accurate context.

The sentiment analyzer unit of the search system then analyzes each piece of text for subjectivity, performs textual scenario matching and filters the subjective sentences and assigns appropriate polarity based on supervised training rules, by deciding if the particular sentence or paragraph is favorable or unfavorable to the price of the asset in the case of the financial industry example (58,60). Examples of the polarities (negative, neutral and/or positive scenarios) are shown in FIG. 2.

The sentence or paragraph extracted from the piece of content may be marked with the topic tags, polarity tags, index markers, sentiment values etc. and stored in the store 48 that is coupled to the context search engine, the sentiment engine and the linguistic components. The traditional sentiment analysis is focused on the document level, helping users to find whole documents that in the aggregate have a positive or negative tone, as opposed to the sentence or paragraph level where the topic of interest is located. For example, the document level sentiment scores may be computed based on the sentence level scores as a net sentiment percentage of the total possible count. For example, Number of positive statements—Number of negative statements divided by the total number of statements may be used to determine sentiment score of the document, although other methods may be used to determine the sentiment score for the document. In the system described here, the sentiment tags and the topic tags at the sentence, sub-sentence and/or paragraph level provide the user with granular search capabilities and let them find the relevant text that can explain or help predict price changes for a given asset. The search system may then store the final results of all the tagged information in the store 48 associated with the search system.

Figure 3:
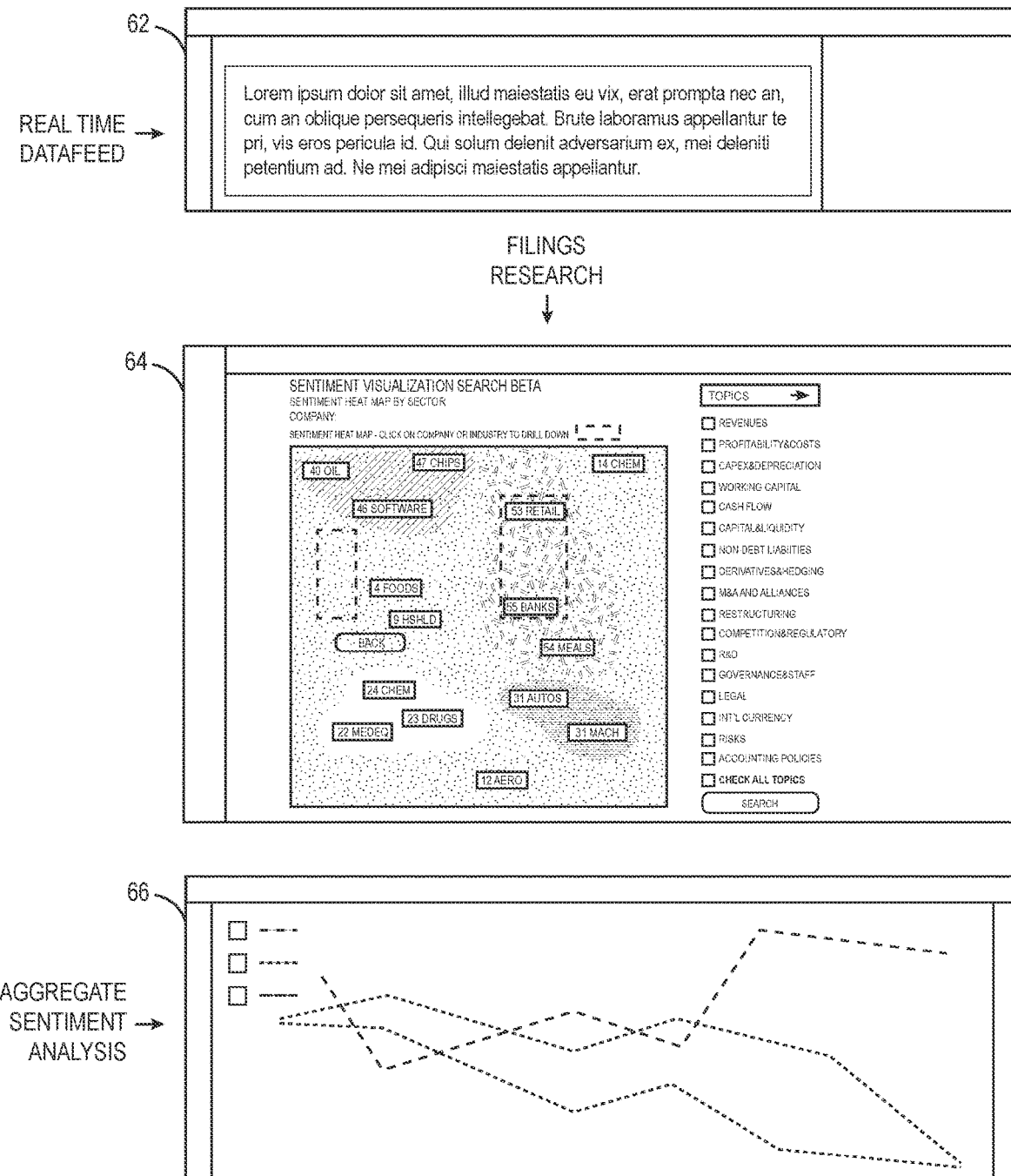
FIG. 3 illustrates examples of the user interface of the deep search system.

The system presents a user interface to the user (See FIG. 3 for example), in which the user interface may provide a reading/browsing/searching user interface 62 described below in more detail, a heat map user interface 64 described below in more detail and an aggregated sentiment user interface 66 described below in more detail. Thus, the user interface presents the subjective categories related to financial concepts (in the financial industry example being used for illustration purposes) along with the sentiment categories. The user interface program controls the context search engine by directing the sentiment and contextual topic analyzing subsystems to extract relevant information and return the results back to the user's machine. The information extraction based on the user's preferences may be performed at periodic intervals as new files show up at the data sources. During a search operation, the search agent reviews the text obtained from one or more information sources, identifies the document or documents relevant to the query. Then it performs the context and sentiment extraction at the sentence, paragraph, or at appropriate granular level to find the text portions that match the stated request, highlights the sentiment appropriately, filters or underlines the sentences that match the topic(s), and brings back the result in an easy to read format to the user. The users may be given the choice to quickly drill down to the specific portions and find out the sentiment level, with matching topics and retrieve relevant text that enables them to make better investment decisions in the financial industry example being used for illustration purposes.

Figure 4:
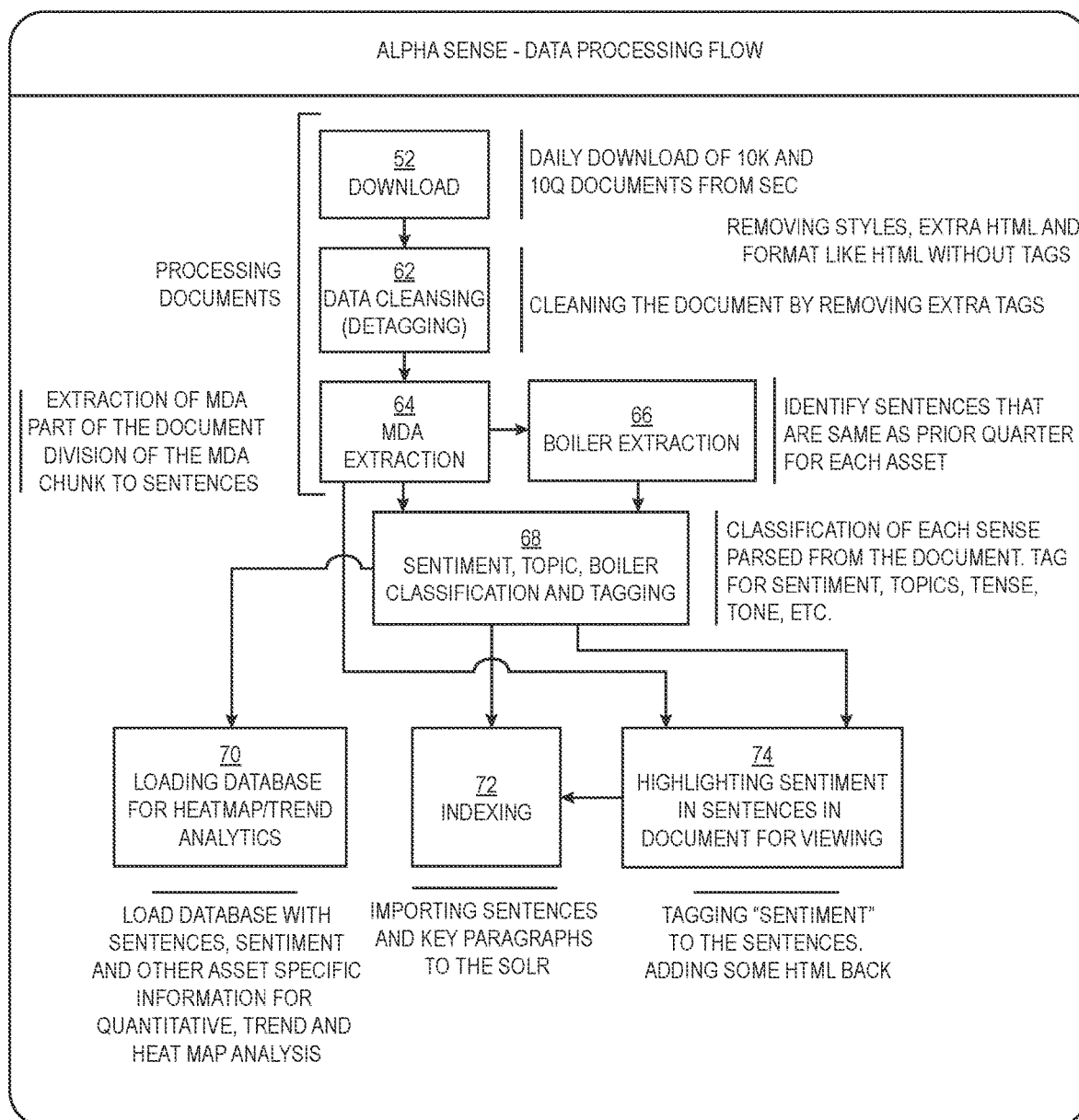
FIG. 4 illustrates more details of the deep search process in the financial domain.

FIG. 4 illustrates more details of the deep search process 50 in the financial domain. The process shown in FIG. 4 may be performed for each document/piece of content. In FIG. 4, some of the processes are the same as those shown in FIG. 2 above. Thus, in the financial domain, the retrieving/downloading process 52 may involve the daily or intra-day download or other periodic retrieval of financial documents, such as 10K and 10Q documents from the SEC, which are processed by the system.

Once the financial documents are retrieved, the system performs a data cleansing process 62 in which the system, among other things, removing extra tags, removing styles, removing extra HTML code and reformatting the financial document as HTML without tags. In addition, for example for SEC packages of documents, the system may extract the HTML and text documents from the SEC package and append them into one HTML document. In more detail, the document is received as an HTML formatted document and plain text documents. In order to identify sentences of text in the documents, the system determines what chunks of text are useful statements, where a sentence starts and ends and how HTML may alter the document. In particular, to determine what text chunks are real statements that state something about a matter of affairs, such as: ComEd has no remaining costs to be recognized related to the rate relief commitment as of Sep. 30, 2010, as compared to text chunks that are titles, page footers and headers, such as: Table of Contents or (Dollars in millions, except per share data, unless otherwise noted), the content extracting unit uses a combination of sentence features, such as HTML tags, end-of-sentence punctuation signs, and length thresholds of sentences (in number of words and characters), to separate useful content from the extraneous content. To determine where a sentence begins and ends, the content extraction unit splits sentences at punctuation signs, but takes abbreviations and acronyms into account, such as Mr., Inc., and U.S. If a document is HTML, sentences can usually be expected to occur entirely within one pair of enclosing tags, such as begin and end of paragraph: <p>. . . </p>. There may be multiple sentences within one paragraph, but sentences are not usually split over multiple paragraphs.

However, if a sentence is split over a page break, or if the document is plain text without any HTML formatting, the system concatenates chunks of text to reconstruct the paragraphs in the text by using some heuristics based on the spacing of the text and the occurrence of page footer and header clues, so as not to erroneously concatenate text that does not belong together, such the end of a paragraph and a following section title. When the particular document is split into sentences, each sentence is saved as plain text under TxtData/ and the document is saved as HTML with each sentence embedded with <span> tags, which are used by the search system to highlight sentences when the sentences are displayed to the user.

Once the extraneous content in the document is removed, the content extraction unit extracts the key sentences/portions in the piece of content (64) (such as the Management's Discussion and Analysis (MDA) portions of an SEC filing). An SEC filing contains different sections, such as a document header, document body, and exhibits section. Within the body and exhibits, there are subsections, such as the Management's Discussion and Analysis (MD&A) and the Notes to the Financial Statements. The location of these sections are identified by a combination of regular expression patterns, and some information of the size and order of sections in the document, and some excluding patterns that disqualify matching patterns that occur in the wrong context, such as in the table of contents. The system thus extracts these key portions of the document.

The content extraction unit may also extract recurring/boilerplate sentences in the content (66) (such as sentences that are the same as in prior documents for each asset in an SEC filing).

As companies file on a quarterly basis, typically some of the text they submit is repeated from earlier reports. The content extraction unit identifies the recurring statements and indicate that they are "less interesting" than the new statements by coloring the recurring statements grey in the user interface when shown to the user and by storing them in the store 48 with an indicating that they are recurring statements. Recurring statements are identified by comparing each statement in the current filing to all statements in the previous filing of the company (through the use of the store 48) and a comparison is performed on normalized statements, where some stop words and whitespace characters are ignored. Thus, the system also extracts these recurring portions of the document from the document and store them in the store 48. In one implementation, information about all filings that are currently in the system for a company (in the financial example) are stored in a FORM_TBL table in the store (that may be implemented using MySql) and the recurring sentences are tagged in the files in TxtData/. As in the following steps, each file is read from TxtData/, modified, and written back to TxtData/.

Once the various sentences have been extracted from the document, sentiment, topic, recurring/boilerplate classification and tagging (68) are performed in order to tag and classify each sentence in the document including tags for sentiment, topics, tense, tone, etc. Using a topic taxonomy that is specific to the industry or field in which the documents pertain, the search system identifies which topics are present in the sentences (such as Revenue, Cash flow, Risks, etc. for the financial industry). The search system may also perform part-of-speech tagging using a linguistic tagger to identify the parts of speech of the words in the sentences (nouns, verbs, etc.) and the results may be saved under PosTagged/. The system may also identify sentences that are forward looking (containing present and future tense, plans, intentions, . . . ) where part-of-speech tags in combination with industry knowledge based taxonomies are used here for disambiguation (forward looking statements in SEC filings). Boilerplate sentences that typically occur in all filings (such as those explaining what "Forward looking statements" mean) may be similarly recognized and tagged for removal.

The range topics for a particular industry are selected since some topics are of particular interest to financial analysts, such as Sales, Orders and Backlog, Same Store Sales or Net Interest Income. To tag the topics for a particular industry, like the financial industry, the system provides key topic search queries that have been predesigned by financial experts and that identify statements in the text that contain references to the topics. For example, the Orders and Backlog topic may correspond to the following example search query:

([orders] or [sales order] or [services order] or FOLLOW(5, [order], cancellation) or [order rate] or [commercial order] or [delivery order] or [order amounts] or [order activity] or backlog or [task order] or [signings] or [order value] or NEAR(5, [order], customer) or [customer order] or NEAR (5, [order], delay) or NEAR(5, [order], cancellation) or FOLLOW(5, time, [order]) or [change order] or [order volumes] or [order volume] or [ordering patterns] or [order is taken] or [order size] or FOLLOW(5, [order], shipped) or FOLLOW(5, return, [order]) or [product order] or FOLLOW(5, convert, [order]) or [subscription order] or [order growth] or FOLLOW(5, completion, [order]) or [average order] or [order exists] or [new order] or [order book] or [firm order] or bookings) and not ([auction rate securities] or [court] or [courts] or [court's] or [obligations] or [commitments] or [in order to])

This query contains the boolean operators or, and, and not that combine different search terms into one query. Words or phrases enclosed in square brackets are literal matches; e.g., [orders] matches the word "orders" (irrespective of character case). Words without square brackets are stemmed before matching; e.g., customer matches any inflected form of "customer": "customer, customers, customer's". The special functions FOLLOW and NEAR indicate a set of words that have to occur within a window of predefined size, allowing for stray words within the window that do not match any of the words in the query; e.g., FOLLOW(5, [order], cancellation) indicates that the word "cancellation" may occur at a maximum distance of 5 words from the word "order", in the given order: "order" before "cancellation". The function NEAR works as FOLLOW but the order of the words within the clause is free.

An example of the results for tagging sentences for boiler, forward looking statements and topic may be:
The document title/filing: 0001193125-10-241317.txt Company:
Google Inc
Form type: 10Q
Filed on: 20101029
Sentence: On an ongoing basis, we evaluate our estimates, including those related to the accounts receivable and sales allowances, fair values of financial instruments, intangible assets and goodwill, useful lives of intangible assets and property and equipment, fair values of stock-based awards, income taxes, and contingent liabilities, among others.
Sentence id: 112773 is boiler: yes
zone: footnotes, document body Forward Looking
Sentence: yes
Topics: Accounting Policies; Working Capital; Revenue; Capex & Depreciation;
Capital Liquidity; Profit & Costs Sentence: A discount factor was applied over these estimated cash flows of our ARS, which is calculated based on the interpolated forward swap curve adjusted by up to 1,700 basis points to reflect the current market conditions for instruments with similar credit quality at the date of the valuation and further adjusted by up to 400 basis points to reflect a discount for the liquidity risk associated with these investments due to the lack of an active market.
sentence id: 243505 is boiler: yes
zone: footnotes, document body
fls: yes
topics: Cash Flow; Accounting Policies; Derivatives and Hedging; Revenue; Capital Liquidity; Risks Sentence: For all acquisitions completed during the nine months ended Sep. 30, 2010, patents and developed technology have a weighted-average useful life of 4.1 years, customer relationships have a weighted-average useful life of 3.3 years and tradenames and other have a weighted-average useful life of 4.0 years.
sentence id: 384406 is boiler: no
zone: footnotes, document body
fls: no
topics: Revenue As described above, the linguistic unit also discerns the topic of the content using special linguistic rules. The linguistic rules may be, for example:
@MACRO@ @V-MODAL@
(could|may|might|must|shall|should|will|wo|would)/MD
Or the following macros:
@MACRO@ @@ ( ) //Left/start edge of expression
@MACRO@ @@ ( ) //Right/end edge of expression
@MACRO@ \w [\a-\z\A-\Z\_\0-\9] // A word character
@MACRO@ @VB@ (\w+/VB) // Head verb base form
The natural language processing may include, for example:

We add linguistic knowledge to the statements by using a part-of-speech tagger or syntactic parser. An example of a statement with part-of-speech tags is:
The/DT latter/JJ action/NN would/MD cause/VB some/DT delay/NN in/IN the/DT effectiveness/NN of/IN rates/NNS that/WDT might/MD otherwise/RB become/VB effective/JJ in/IN June/NNP 2011/CD ./.

This linguistic annotation is used in a consequent step that assigns tense to the statement. This means that we identify whether the statement is forward-looking, referring to a future event.

The system defines macros for some frequently occurring constructs, e.g., a macro for modal and auxiliary verbs examples of which are described above for the linguistic rules.

The macros are regular expressions containing information on the words and the part-of-speech tags of the words in a statement. The macros can be used in rules, such as in the following rule:
@@ @ADVP@? @V-MODAL@ @ADVP@? @VB@ @ADVP@? @@

For fast matching, the regular expressions are compiled into Finite State Automata using finite-state algebra.

The search system may also use a syntactic parser, e.g., a dependency parser. For example, the dependency parse of the sentence:
The company has available a $750 million bank credit facility that expires in December 2010.
looks like this:
det(company-2, The-1)
nsubj(has-3, company-2)
dep(has-3, available-4) det(facility-11, a-5)
num(facility-11, $-6)
number($-6, 750-7)
number($-6, million-8)
nn(facility-11, bank-9)
nn(facility-11, credit-10)
dep(available-4, facility-11)
nsubj(expires-13, that-12)
rcmod(facility-11, expires-13) prep(expires-13, in-14)
pobj(in-14, December-15) num(December-15, 2010-16)

Each dependency consists of a relation (e.g., det=determiner) between a head word (e.g., company) and its dependent (e.g., The). Each word token has an ID number attached to it (e.g., company-2) by which it is possible to uniquely identify that word occurrence; this is necessary if the same word occurs multiple times in the sentence, in different syntactic positions.

Rules can be expressed using dependencies. For instance, the sentence above is classified as forward-looking because the dependency prep(expires-13, in-14) matches the rule:
prep(({ V}(expire|expires|expiring)@ID@),(at|before|in|on|within)@ID@)// expires on Example of Results
The/DT latter/JJ action/NN would/MD cause/VB some/DT delay/NN in/IN the/DT effectiveness/NN of/IN rates/NNS that/WDT might/MD otherwise/RB become/VB effective/JJ in/INJune/NNP 2011/CD./.

The above rule determines that the statement "The latter action would cause some delay in the effectiveness of rates that might otherwise become effective in Jun. 2011." is forward-looking, because it contains the constructs: would/MD cause/VB and might/MD otherwise/RB become/VB.

The sentiment analyzer unit may classify sentences in a document/piece of content as objective (=neutral sentiment) vs. subjective (=positive or negative sentiment). Sentiment extraction involves three steps:

1. Feature extraction: Terms, phrases, or co-occurring words that are judged to be relevant from the point of view of sentiment classification are selected by a domain expert according to the approaches described in above. Another alternative is using n-grams or a combination of features.

2. Objective vs. subjective classification: Supervised machine learning is utilized to learn to distinguish between objective and subjective statements based on the features of step 1. The machine learning techniques can be linear regression, Support Vector Machines, decision trees, or artificial neural networks, to name a few.

3. Positive vs. negative classification: If the sentiment is in step 2 is classified as subjective, then a further classifier classifies the statements as positive or negative or neutral, based on pattern matching against a large database of positive, negative and neutral textual features built by financial domain experts. The open source Support Vector Machine algorithm (LibSVM) is trained based on the annotators results by letting it figure out the key features that happen to affect the predictions the most. This part of the algorithm is based on the open source implementation. The features and the guidelines that drive the annotations described earlier, determine the effectiveness of the classification results and thus distinguish our sentiment prediction from other approaches that happen to use the SVM or other machine learning techniques.

In some embodiments of the system, processes 2 and 3 above may be combined into one single machine learning step. Consider, for instance, the following rule-based approaches to feature extraction for sentiment:
a. A rule is expressed as an accurate search query with Boolean logic, as described above:

Feature_our_Projection:
FOLLOW(3, [our] or [its] or company or management, estimate or estimation or target or forecast or forecasted or [projected] or [projection] or [we project] or [company projects] or [projection] or [we project] or [company estimates] or [management estimates]) and not (FOLLOW(3, sales or selling or marketing, expense or expenditure or cost)) and not(FOLLOW(3, require, us, to, estimate) or FOLLOW(3, estimate, that, have, realized) or FOLLOW(3, we, review, our)) and not(FOLLOW(3, tax, rate) or FOLLOW(3, fair, value) or FOLLOW(3, ongoing or going, basis) or FOLLOW(3, continually or continuously, evaluates) or FOLLOW(3, useful, life) or FOLLOW(3, in, making, its) or FOLLOW(3, realizable, value) or FOLLOW (3, discounted, cash, flow))

b. A rule is expressed as a regular expression taking into account both the surface forms of words and potentially their part-of-speech tags, as described above:
Feature_Revenue_Volumes_Revenue_Growth:
@@ (revenue|sales|royalty|business) @WORD6@ (growth|grow|expansion|ex pand|increase|increasing|enhancement|improvement|improving|improve) @@, where the macro @WORD6@ corresponds to a sequence of stray words, minimum zero and maximum six words:
@MACRO@ @WORD6@ @WORD@? @WORD@? @WORD@? @WORD@? @WORD@? @WORD@?

A rule is expressed as one or multiple dependency relations between words.

c. If a full syntactic parser is not available or not a feasible solution (e.g., due to heavy computational requirements), shallow parses can be produced using a set of cascaded rules that are applied on a part-of-speech tagged sentence. Shallow parses are parses of chunks or phrases within a sentence, not necessarily covering the syntax of the entire sentence.

If we start with the following part-of-speech tagged sentence:
The/DT company/NN has/VBZ available/JJ a/DT $/$ 750/CD million/CD bank/NN credit/NN facility/NN that/WDT expires/VBZ in/IN December/NNP 2010/CD ./.
We get the following shallow parse:
<NP>The company</NP>
<VP>has</VP>available/JJ
<NP>a $750 million bank credit facility</NP>
<NP>that</NP>
<VP>expires</VP>
<PP>in December 2010</PP>
./.
Which contains the chunks:
DP 62 0
<DP>The</DP>
DP 62 1 <DP>a</DP>
TIME-NP 78 2 num(December,2010)<TIME-NP>December 2010</TIME-NP>
NUM 85 3 number(million, 750)<NUM>$750 million</NUM>
NOM 87 4 nn(facility, bank credit)<NOM>bank credit facility</NOM>
NOM 101 5 num(bank credit facility, 750 million) <NOM>$750 million bank credit facility</NOM>
NP 108 6 det($750 million bank credit facility| a)
  <NP>a $750 million bank credit facility</NP>
NP 109 7 det(company, The)<NP>The company</NP>
PP 119 8 pobj (in, December)<PP>in December 2010</PP>
VP 148 9 <VP>has</VP>
VP 148 10 <VP>expires</VP>
NP 150 11 <NP>that</NP>

To extract sentiment topic features, dependency rules can be written that operate on the dependencies discovered by the shallow parser.

As a result of the processes above, the store 48 has a plurality of sentences for each document with each sentence or other portion of the document having one or more topics tags and sentiments associated with each portion of the document. This combined data is them used to perform the deep searches as described below and generate the user interfaces that are described below.

Figure 7:
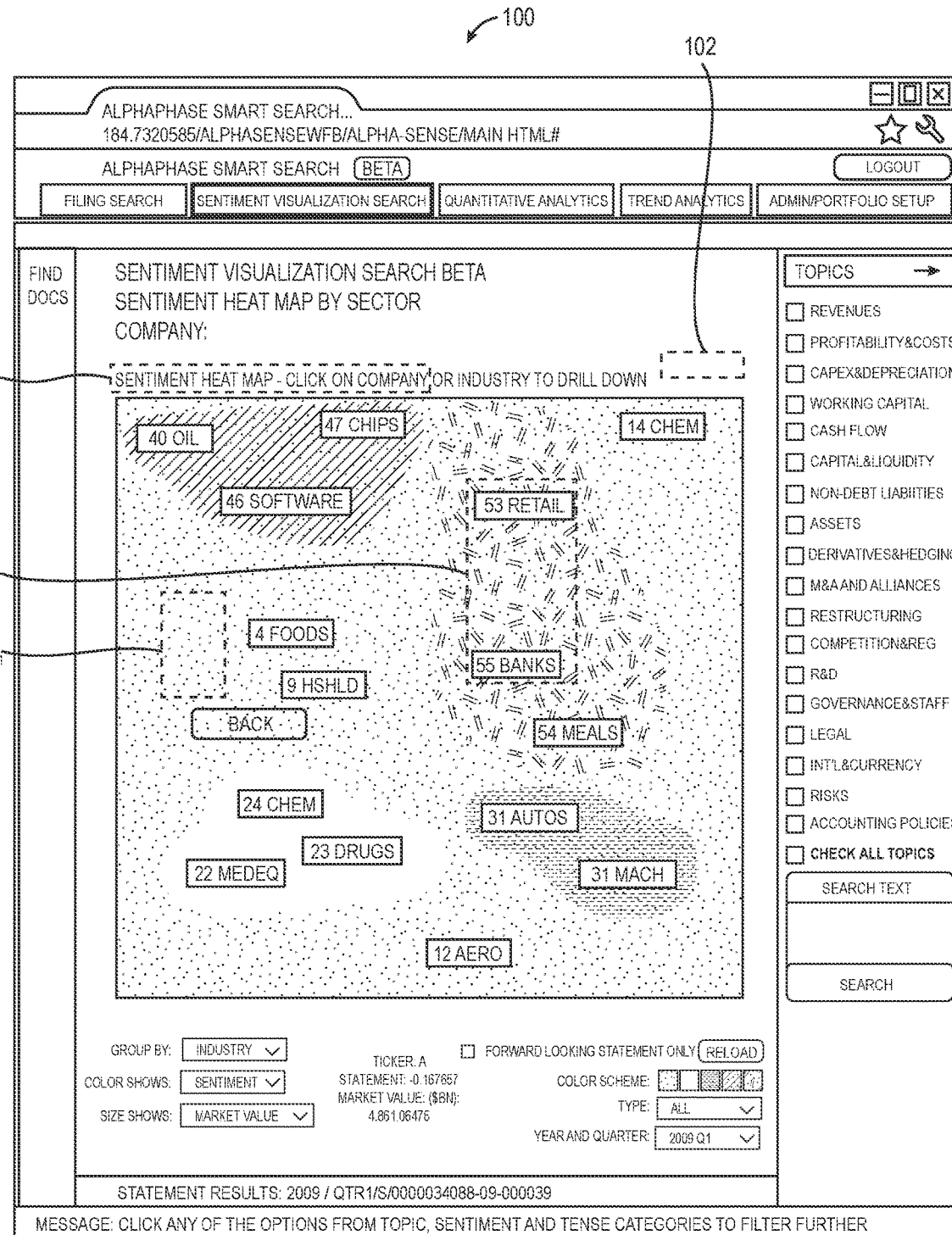
FIG. 7 illustrates another example of a search results user interface of the deep search system.

Once the tagging and classification has been completed, the sentences, sentiments of the sentences and other asset specific information for qualitative, trend and heat map analysis may be loaded into a database (70) so that for example, the heat map as shown in FIG. 7 may be generated by the system.

In addition, the sentences and key paragraphs may be loaded into a SOLR database (72) during indexing so that the search engine can performs its deep searches based on the portions of the documents, the topic tags and the sentiments. In more detail, XML is created that corresponds to the SOLR entries, both on sentence level (TopicXml) and filing level (FullFilingXml). In addition, the data is posted to SOLR, which makes the filing appear in the web application. For historical reasons, the sentence level info is stored in SolrTopic, and the filing level info is stored in SolrMda. In addition, the system also highlights sentiments in the sentences of the document (74) for later viewing as described below in which the sentiments are "tagged" to the sentences and some HTML is added to reflect the highlighting.

Figure 5A:
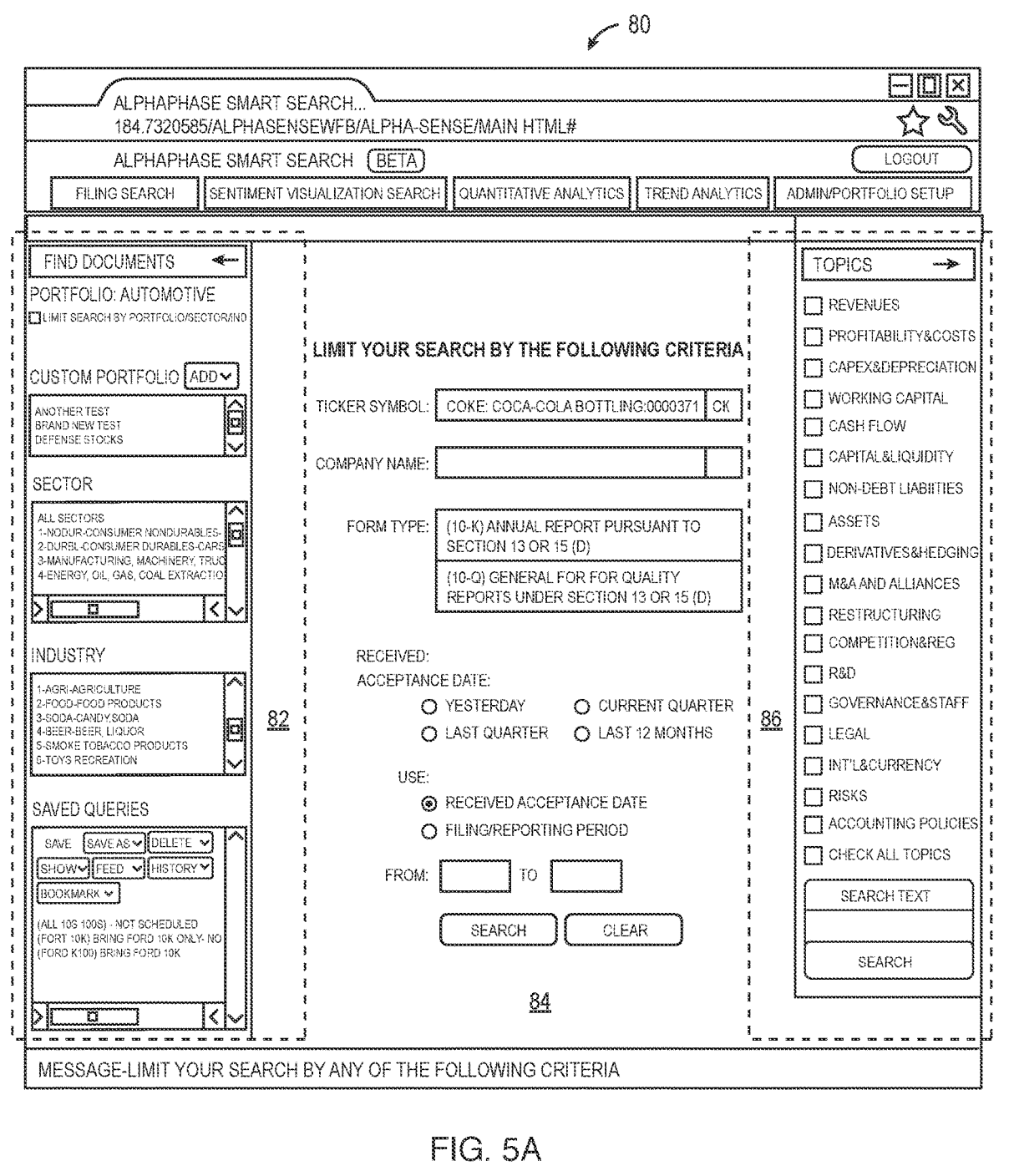
Figure 5B:
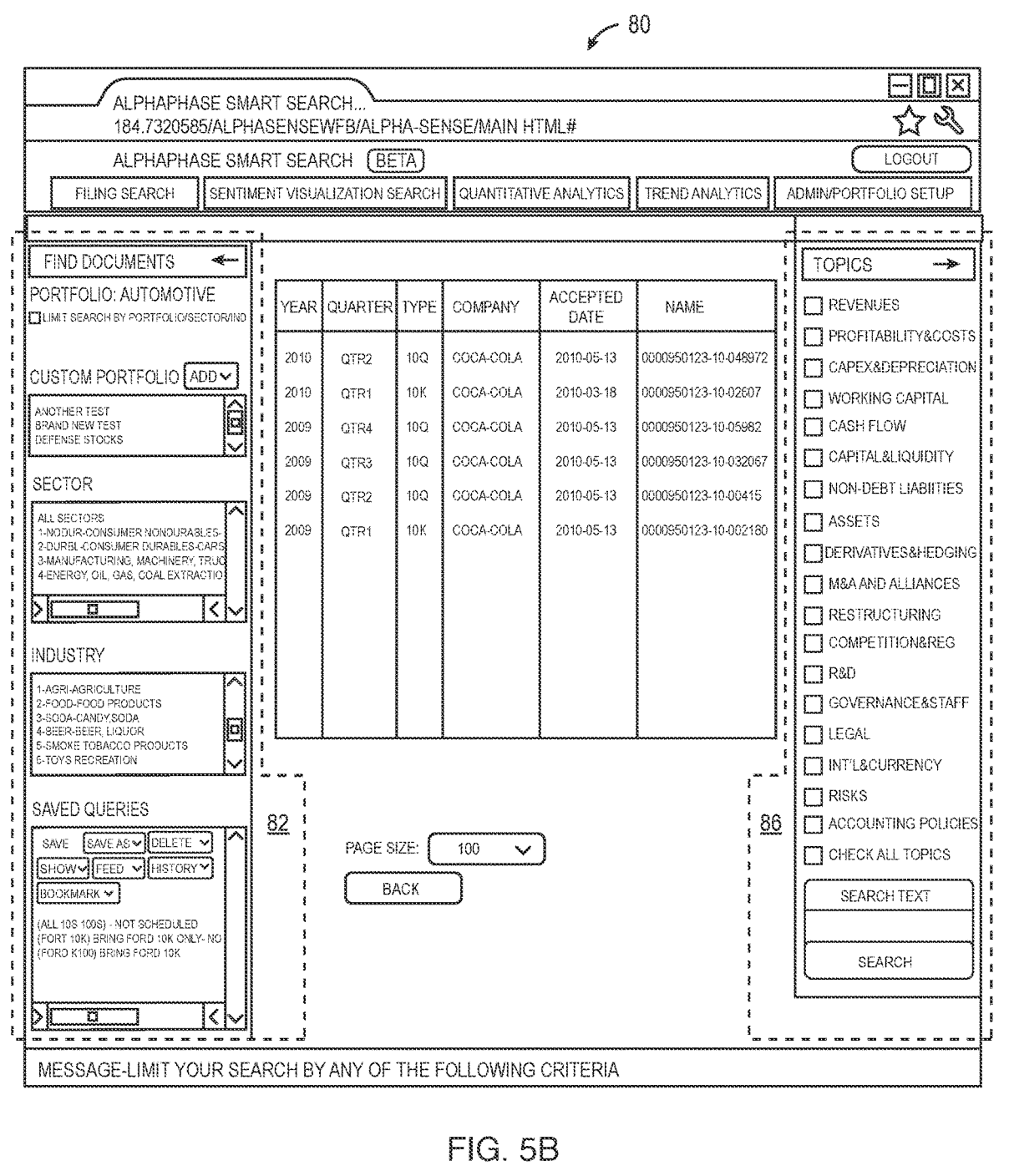
Figure 6:
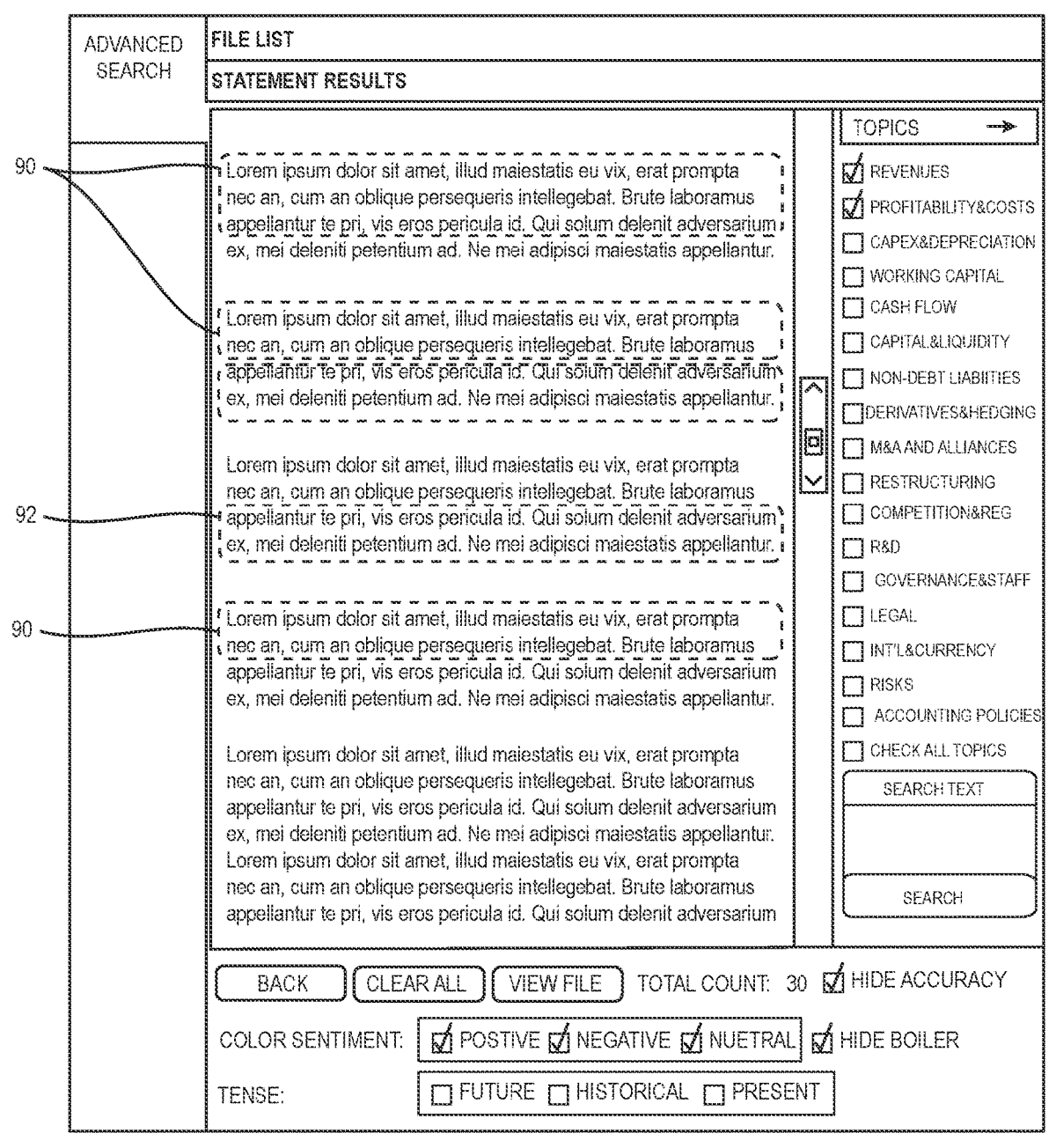

FIGS. 5A and 5B illustrate an example of a search user interface 80 for the deep search system for an initial query and a list of results, respectively, in the financial industry. The user interface has a find documents portion 82 that allows the user to specify search criteria for the search by sectors, industries, portfolios, stocks, market capitalization ranges, date ranges, keywords, saved queries and the like. The user interface also has a viewing portion 84 that in FIG. 5A has a form to enter specific search criteria and in FIG. 5B has a list of responsive documents based on a search. The user interface 80 may also have a topics portion 86 that lists the topics associated with the particular subject matter area, the financial industry documents in this example. When the system is used in a different subject matter area, such as the law, the system would like a different set of topics in the list. The list of topics portions can be used at any time during the viewing of documents to change the topics of interest. Any time that the user changes the topics, the viewing portion 84 is dynamically updated as the user changes the topics, for example. In FIG. 5B, if the user selects one of the returned documents shown in the viewing portion 84, the user interface displays the extracted sentences and sentiments for each extracted sentence as shown in FIG. 6. As shown in FIG. 6, the different sentiments of the sentences are shown in different colors (red for negative sentiments 90, green 92 for positive sentiments and plain black/uncolored for neutral sentiment statements.) Specific cue words used in determining sentiment, topic or tense may also be underlined or otherwise marked (although none are shown in the example). In addition, since the system extracts recurring sentences, the user interface may also shown recurring sentences as grayed out (although none are shown in FIG. 6 since the filter to hide boiler sentences has been activated in FIG. 6.) The search system viewing as shown in FIG. 6 allows the user to rapidly review a long document, such as a new SEC filing, and quickly see sentences in the document that are positive, negative or neutral. For the financial world, this deep search engine allows the user to quickly review company SEC filings and determine the effect of the sentences in the filing on the stock price of the company, for example, or to screen a large number of filings for new negative or positive statements on a given topic of interest, where the topic of interest could be "all new negative forward looking statements made by large-cap retail companies in the most recent quarter about their sales in Asia" (which would be done by appropriate selection of filters and searches within the example system).

FIG. 7 illustrates an example of a sentiment heat map user interface 100 of the deep search system. Due to the documents having sentences tagged with sentiment, the sentiment heat map is able to calculate and show the sentiment by industry (such as oil 101, integrated circuits (chips) 102 and the beer industry 104) or other criteria, the colors show the level of positive or negative or neutral outlook for the companies in the industry and the size of rectangle in any one industry corresponds to the market value of the company in the industry in which the larger rectangle indicates are larger market value company. For example, in the oil industry, the larger market value companies have negative sentiments, but a smaller company has a positive sentiment as shown by the smaller green rectangle $101_1$. In the sentiment heat map, the user can click on any rectangle, see the company name and then select that company to see its documents and the sentiments of the sentences in the documents for the company that led the system to calculate a given sentiment score and display it on the heatmap. The user can alter selections such as the recurring, topic and tense filters, which are dynamically reflected in the heatmap display, with a new sentiment number calculated for all the companies shown.

Figure 8:
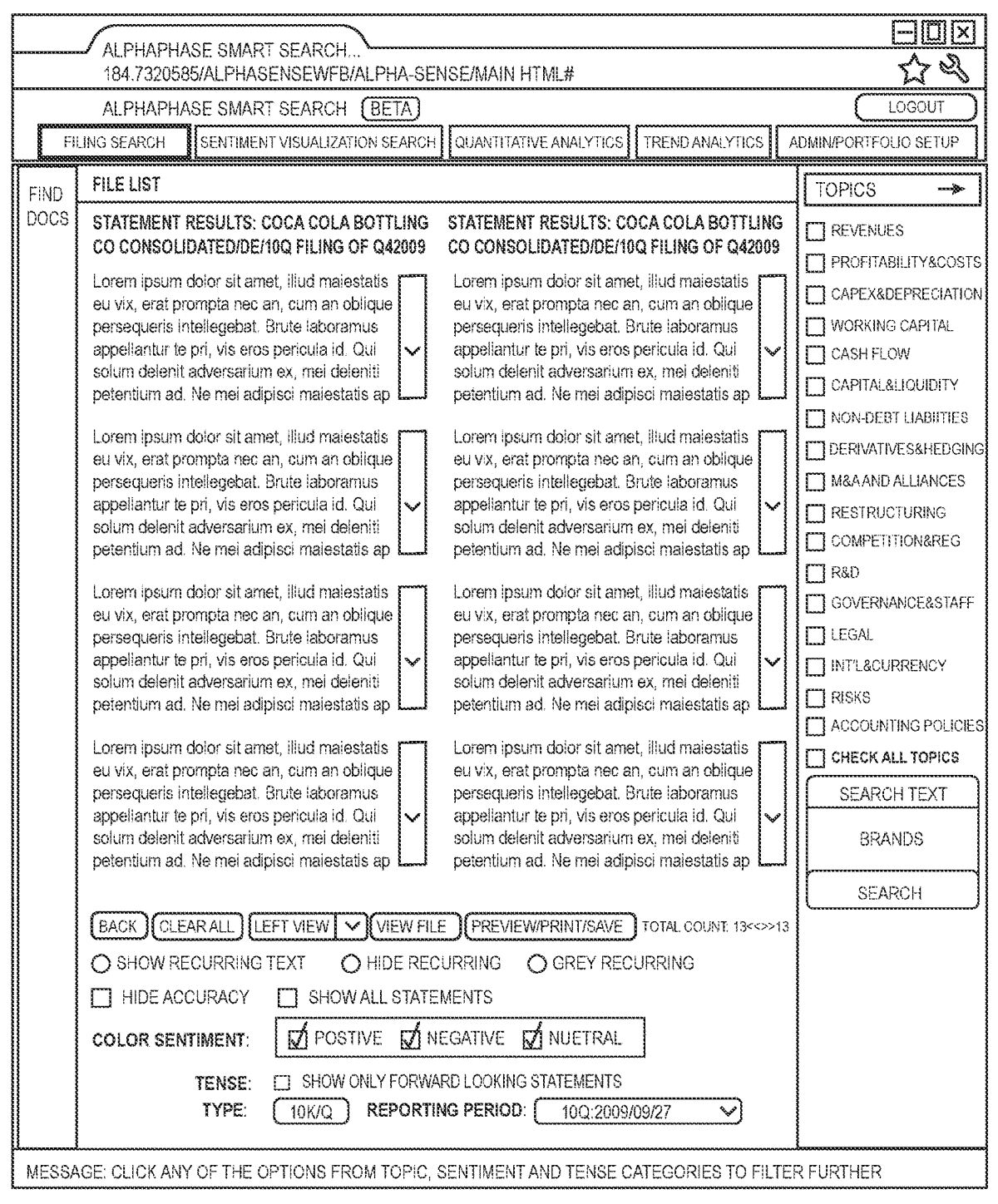

FIG. 8 illustrates an example of a search results user interface of the deep search system, where the viewing interface allows the user to compare documents side by side that is made possible by the deep search system and processes described above.

The processes of the deep search system and method described above can be used to generate reports for the user that help the user quickly review a quick "cliff notes" summary of the document or a range of documents because the system as described above can identify relevant sentences within a large document, or many documents, based on the user's custom criteria (e.g. topic, tense, tone, recurring, keyword search, industries, market caps, etc. . . .), and create the document summary of summary of a range of documents. Thus, using the system, a user can skim-read through a pre-highlighted document or multiple documents, focusing on what he had pre-defined as important (and what the system thus highlighted), as opposed to having to read everything. The deep search system may further have a report generator unit that generates reports, such as those shown in FIGS. 9A-10B below based on the processes above.

FIGS. 9A and 9B illustrate portions of a document highlighted that is made possible by the deep search system. In particular, the document is an SEC filing for a company and the system has modified the document to make it easier for a user to quickly review. Using the content extraction, linguistic/tagging process and the sentiment determination process described above, the system highlights different sentences of the document. For example, the system highlight one or more sentence(s) 110 in yellow that match a user's indication of interest in the sentence based on various criteria but are recurring sentences and shown by the grayed out text, highlights one or more sentence(s) 112 is blue that are identified by the system but are recurring sentences and shown by the grayed out text, highlights one or more sentence(s) in yellow that match a user's indication of interest in the sentence based on various criteria and are not recurring sentences and highlights one or more sentence(s) in blue that are identified by the system and are not recurring sentences. In the example in FIGS. 9A and 9B, the user search term was for "new forward looking statements about revenue"—i.e. incorporating both topic and tense into same query, while filtering (or graying) out recurring statements (i.e. those that were simply repeated from the prior filing). The value of this is to help the user quickly skim-read through a pre-highlighted document, focusing on what he had pre-defined as important (and what the system thus highlighted), as opposed to having to read everything.

FIGS. 10A and 10B illustrate an example of a multi-document summary that is made possible by the deep search system. Traditional search engines return full documents that had something potentially relevant in them, and a user has to spend endless amounts of time clicking through those documents to see if there is something potentially useful. However, using the processes of the deep search system, the user can have a custom report generated as shown in FIGS. 10A and 10B which is a user-defined summary of what a selection of companies said about a topic of interest to the user. The example in FIGS. 10A and 10B shows what chip makers said about inventory during the past quarter, an indicator of the business cycle in that industry. As shown, the portions of the documents for each company are shown side-by-side 120-124 with the of interest sentences (based on the user's expressed interest) are highlighted so that the user can quickly review the documents of the three companies in the same industry.

In an implementation of the deep search system, the content extraction processes may include a rule parsing algorithm that emulate key functions such as NEAR, PHRASE, FOLLOW, FUZZY, EXACT, DICTIONARY etc. with the rules being expressed as XML and interpreted by our rule process execution engine wherein the rules are applied to extract the topic features for each sentence. In the same implementation, the linguistic process uses an open source finite state machine, regular expression optimizers and PERL style Regular Expression generators. In the same implementation, the sentiment analyzer process uses a combination of linguistic rules and machine learning techniques such as SVM (Support Vector Machine) and Neural Network models. In the sentiment analysis, the system is seeded with the topic features based on topic extracting rules and linguistic features based on shallow and some deep parsing algorithms. Then, the machine learning algorithm select the appropriate features based on human annotated sentences.

While the foregoing has been with reference to a particular embodiment of the invention, it will be appreciated by those skilled in the art that changes in this embodiment may be made without departing from the principles and spirit of the disclosure, the scope of which is defined by the appended claims.

What is claimed is:

1. A system for rendering information from a database onto a user interface of a remote computer, the system comprising one or more processors operable to:
    receive a query from a user at the remote computer to search within the database,
        wherein the database comprises a plurality of documents,
        wherein the documents are related to at least one publicly traded company, and wherein the user query includes:
information identifying a publicly traded company of the at least one publicly traded companies;
a first keyword distinct from the publicly traded company; and
a second keyword distinct from the first keyword and the publicly traded company;
execute a search based on the user query;
generate search results in response to executing the search,
wherein the search results include documents associated with the publicly traded company in the user query and that contain an identified snippet of text from within the documents,
wherein the identified snippet of text comprises a complete sentence, and
wherein a snippet of text is identified when the first keyword or the second keyword appears in a searched document;
in response to one or more new documents in the database of the plurality of documents, generate a report based on the search,
wherein the report comprises a new identified snippet of text and an identification of a new document of the one or more new documents,
wherein the new document is associated with the new identified snippet of text; and
cause to render at least a portion of the new document from the report on the user interface,
wherein the rendered portion of the new document includes the new identified snippet of text, and wherein at least a portion of the new identified snippet of text is highlighted in the rendered portion of the new document.

2. The system of claim 1, wherein the report is generated at periodic intervals.

3. The system of claim 1, wherein the search based on the user query comprises a key word search.

4. The system of claim 1, wherein the one or more processors cause the portion of the new document from the report to be rendered on the user interface in response to a selection of the new document or the new identified snippet of text from the report by the user.

5. The system of claim 1, wherein the search results include documents of a user-supplied document type.

6. The system of claim 1, wherein the report includes highlighted portions of the identified snippets of text from the search results.

7. The system of claim 6, wherein the one or more processors are further operable to generate a graphical display on a second web page when the user interacts with a designated area of a first web page displaying the report.

8. The system of claim 6, wherein the one or more processors are further operable to generate a tabular display comprising portions of the documents associated with the publicly traded company from the search results when the user interacts with a designated area of a web page displaying the report.

9. The system of claim 6, wherein the report includes portions of one or more documents pre-highlighted in a plurality of colors.

10. The system of claim 1, wherein the one or more processors are further operable to filter a subset of the identified snippets of text from the search results in response to a prompt by the user.

11. The system of claim 1, wherein the report further comprises a negative sentiment or a positive sentiment associated with the new identified snippet of text.

12. The system of claim 1, wherein the one or more processors are further operable to generate a graphical representation of a plurality of sentiments associated with the identified snippets of text from the search results.

13. The system of claim 12, wherein an aggregate of the plurality of sentiments is generated for a time period.

14. The system of claim 13, wherein the one or more processors are further operable to determine a sentiment score for the plurality of sentiments.

15. The system of claim 1, wherein the report comprises a list of a plurality of documents.

16. The system of claim 15, wherein the documents from the list of the plurality of documents from the report are associated with a single publicly traded company.

17. The system of claim 15, wherein the documents from the list of the plurality of documents from the report are SEC filings for the publicly traded company.

18. The system of claim 15, wherein the documents from the list of the plurality of documents from the report are associated with a plurality of publicly traded companies in a same industry.

19. The system of claim 15, wherein the documents from the list of the plurality of documents from the report are associated with a same document type.

20. A method for rendering information from a database onto a user interface of a remote computer, the method comprising:
receiving a query from a user at the remote computer to search within the database,
wherein the database comprises a plurality of documents,
wherein the documents are related to at least one publicly traded company, and
wherein the user query includes:
information identifying a publicly traded company of the at least one publicly traded companies;
a first keyword distinct from the publicly traded company; and
a second keyword distinct from the first keyword and the publicly traded company;
executing a search based on the user query;
generating search results in response to executing the search,
wherein the search results include documents associated with the publicly traded company in the user query and that contain an identified snippet of text from within the documents,
wherein the identified snippet of text comprises a complete sentence, and
wherein a snippet of text is identified when the first keyword or the second keyword appears in a searched document;
in response to one or more new documents in the database of the plurality of documents, generating a report based on the search,
wherein the report comprises a new identified snippet of text and an identification of a new document of the one or more new documents,
wherein the new document is associated with the new identified snippet of text; and
causing to render at least a portion of the new document from the report on the user interface,
wherein the rendered portion of the new document includes the new identified snippet of text, and wherein at least a portion of the new identified snippet of text is highlighted in the rendered portion of the new document.

21. The method of claim 20, wherein the report is generated at periodic intervals.

22. The method of claim 20, wherein the search based on the user query comprises a key word search.

23. The method of claim 20, further comprising causing the portion of the new document from the report to be rendered on the user interface in response to a selection of the new document or the new identified snippet of text from the report by the user.

24. The method of claim 20, wherein the search results include documents of a user-supplied document type.

25. The method of claim 20, wherein the report includes highlighted portions of the identified snippets of text from the search results.

26. The method of claim 25, further comprising generating a graphical display on a second web page when the user interacts with a designated area of a first web page displaying the report.

27. The method of claim 25, further comprising generating a tabular display comprising portions of the documents associated with the publicly traded company from the search results when the user interacts with a designated area of a web page displaying the report.

28. The method of claim 20, wherein the report includes portions of one or more documents pre-highlighted in a plurality of colors.

29. The method of claim 20, further comprising filtering a subset of the identified snippets of text from the search results in response to a prompt by the user.

30. The method of claim 20, wherein the report further comprises a negative sentiment or a positive sentiment associated with the new identified snippet of text.

31. The method of claim 20, wherein the one or more processors are further operable to generate a graphical representation of a plurality of sentiments associated with the identified snippets of text from the search results.

32. The method of claim 31, wherein an aggregate of the plurality of sentiments is generated for a time period.

33. The method of claim 32, wherein the one or more processors are further operable to determine a sentiment score for the plurality of sentiments.

34. The method of claim 20, wherein the report comprises a list of a plurality of documents.

35. The method of claim 34, wherein the documents from the list of the plurality of documents from the report are associated with a single publicly traded company.

36. The method of claim 34, wherein the documents from the list of the plurality of documents from the report are SEC filings for the publicly traded company.

37. The method of claim 34, wherein the documents from the list of the plurality of documents from the report are associated with a plurality of publicly traded companies in a same industry.

38. The method of claim 34, wherein the documents from the list of the plurality of documents from the report are associated with a same document type.

* * * * *